June 26, 1923.
O. M. OTTE
SPOTLIGHT BRACKET
Filed Sept. 10, 1920  2 Sheets-Sheet 1
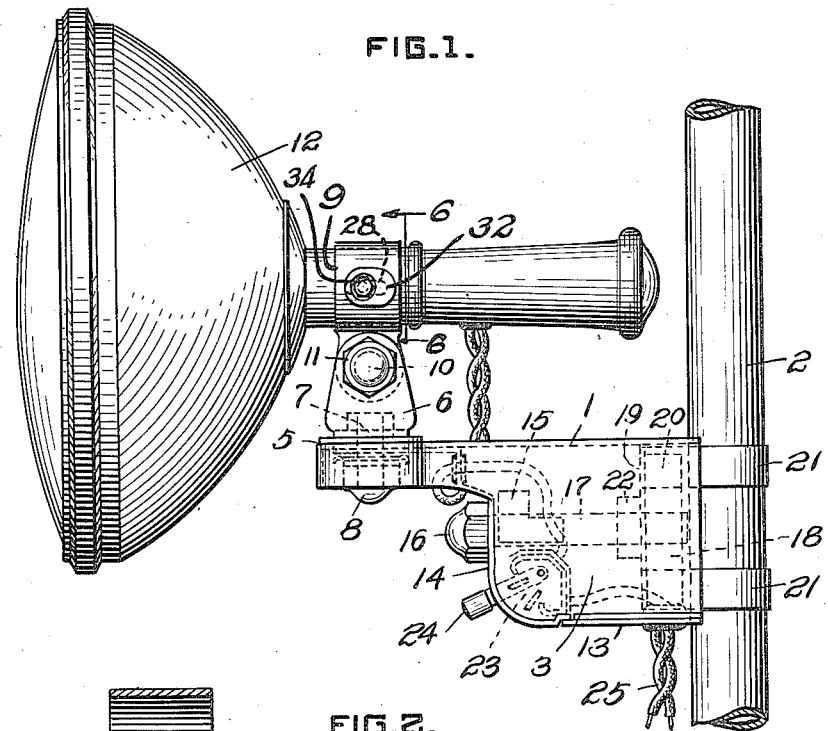
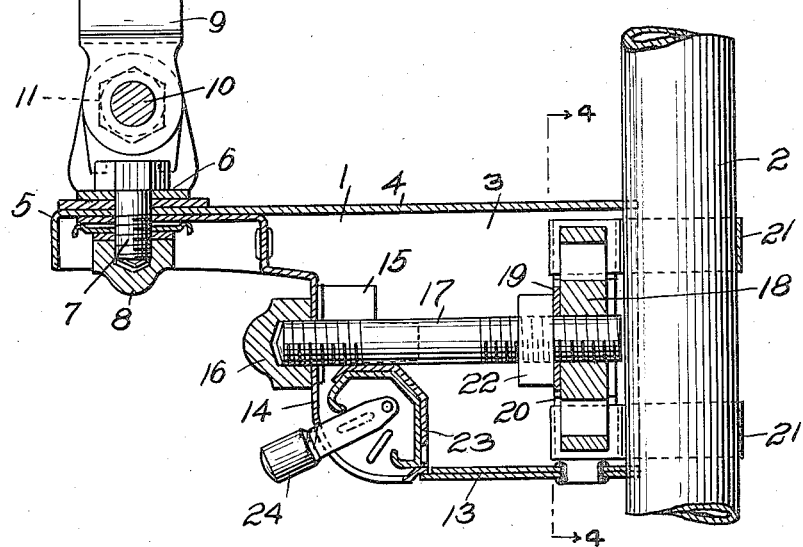
WITNESSES
J. Herbert Bradley
INVENTOR
Otho M. Otte
By Green and McCallister
His attys.

June 26, 1923.
O. M. OTTE
SPOTLIGHT BRACKET
Filed Sept. 10, 1920  2 Sheets-Sheet 2
1,459,856
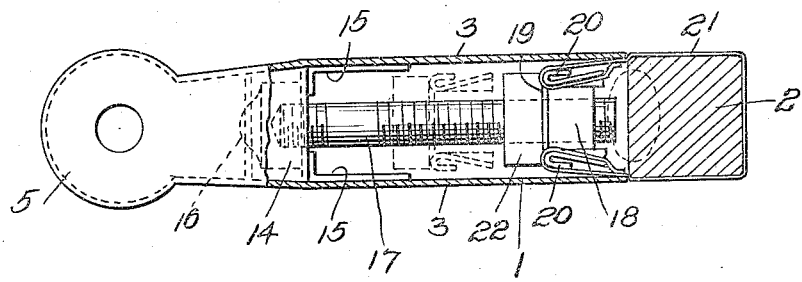
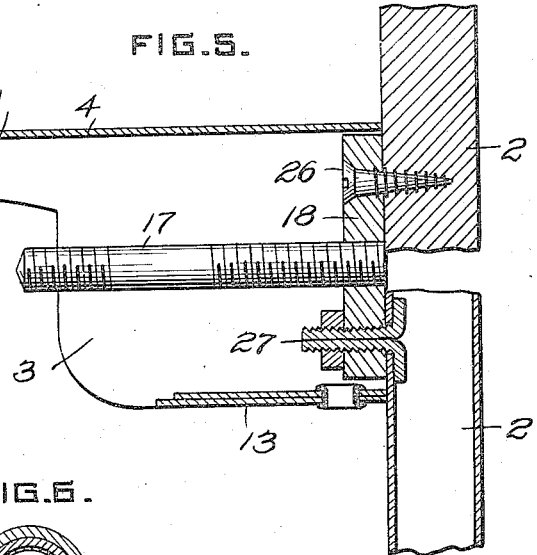
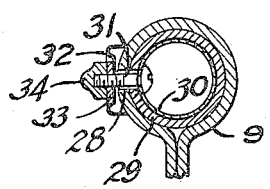
WITNESSES
INVENTOR Patented June 26, 1923.

1,459,856

UNITED STATES PATENT OFFICE.

OTHO M. OTTE, OF TARENTUM, PENNSYLVANIA.

SPOTLIGHT BRACKET.

Application filed September 10, 1920. Serial No. 409,425.

*To all whom it may concern:*

Be it known that I, OTHO M. OTTE, a citizen of the United States, and a resident of Tarentum, in the county of Allegheny and State of Pennsylvania, have made a new and useful Invention in Spotlight Brackets, of which the following is a specification.

My invention relates to spotlights such as are in common use on motor vehicles and consists in a light supporting bracket.

The objects of my invention are to provide a rigid, light supporting bracket from light weight metal stampings, to adapt such a bracket for quick, secure fastening to various shapes and sizes of supporting members, to provide a universal joint mounting thereon for a spot light, to mount a switch within the bracket and to secure these advantages in a construction which will be inexpensive in cost and present a neat appearance.

My invention is illustrated in the accompanying drawings, in which Figure 1 is a side elevation of my bracket mounting a spotlight and supported on an upright member representing part of a windshield frame; Fig. 2 is a longitudinal section thru the bracket and is on an enlarged scale; Fig. 3 is a plan view of the bracket and will be referred to later; Fig. 4 is a vertical, transverse section on line 4—4 of Fig. 2, and Fig. 5 is a section similar to Fig. 2 but showing modifications in the bracket attaching elements. Fig. 6 is taken on line 6—6 of Fig. 1.

A bracket arm 1 extends horizontally from a support 2 shown here as a rod forming a vertical member of a windshield. Arm 1 is a rectangular pressing in which sides 3 are bent downwardly from its top 4. The right hand end of the arm is open and the arm tapers vertically and horizontally towards the left hand end where it is shaped to form a flat, circular bearing 5 for the swivel base 6.

Swivel base 6 is U shaped in section and is pivotally mounted on bearing 5 by a vertical bolt 7 and nut 8. A swivel top 9 is pivotally mounted on base 6 by a horizontal screw 10 and nuts 11. The combined action of the swivel base on its pivot and the swivel top on the base provides the top and a lamp 12 mounted thereon with a universal joint.

The lower portions of sides 3 are bent inwardly, overlapped and spot welded to form the arm bottom 13. The recessed or tapered left hand edges of sides 3 have an opening between them which is filled by a face plate 14 the upper portion of which is secured against the lower part of bearing 5 by bolt 7. Two small clips 15, spot welded to arm sides 3, bear against the main vertical portion of plate 14 which serves as a bearing for a nut 16 threaded on to the outer end of a double ended securing screw 17.

The other end of screw 17 is screwed into a threaded aperture in a yoke bar 18 which forms a part of yoke 19. The latter has a pair of flanges 20 at each end which engage the looped ends of a flexible band 21 which surrounds the supporting rod 2. Screw 17 is provided with a nut 22 which is screwed up to lock the screw 17 in bar 18. When this has been done, nut 16 may be screwed up to pull the face plate against the arm and the arm against member 2.

The lower end of face plate 14 is bent as shown to securely hold a switch 23 which has a handle 24 extending thru a slot in the adjacent portion of the face plate.

The bottom 13 of the main arm has a hole for an electric cord 25 and the short vertical portion of plate 14 adjacent its upper end has two holes for the wires of cord 25. Switch 23 is not detailed herein as its construction forms the subject matter of application Serial No. 421,935, filed November 5, 1920. It will be understood that one wire of the cord is cut and the severed ends are secured to opposite terminals of the switch and both wires are connected to the lamp and to the battery and the lamp current is turned on and off by opposite movements of handle 24.

Fig. 3 illustrates how my attaching elements are adapted to fit different shapes and sizes of supporting members. Straps 21 are flexible and therefore adapted to pass around and closely engage either square, oval or round sections and the adjustment of yoke bar 18 on screw 17 affords simple, easy means for accommodating variations in the sizes of the support members.

Figure 5 illustrates a modified construction in which bands 21 are eliminated and, to attach to a panel, wood screws 26 may be used and, to attach to a tubular supporting member, split bolts 27 may be used. Screws 26 and split bolts 27 hold yoke bar 18 in place and the bracket arm is secured in the same manner as before described by screw 17 and nut 16 and face plate 14.

In both modifications and in the preferred embodiment the essential feature of the securing means is retained, i. e. a plurality of support member engaging parts which are spaced from each other to afford a stable grip, an equalizing yoke and a single adjustable clamping element which is an integral part of the securing means for the bracket arm, comprising the face plate 14 and nut 16.

Figs. 1 and 6 illustrate a simple efficient focusing device. Swivel top 9 is provided with a longitudinal slot 28 which extends thru the lamp handle 29. The lamp socket 30 has a hole which is alined with a portion of slot 28 and thru which a focus screw 31 is inserted. A washer 32, having its edge flanged at right angles and cut to fit the curve of top 9, fits over screw 31 and seats spring washer 33 and a nut 34 which locks the screw 31 and socket 30 in any position desired.

This arrangement enables the lamp to be adjusted forward and backward by loosening nut 34 and using it and screw 31 as a handle for moving the lamp socket.

I claim:—

1. In a spot light bracket, a hollow main arm, adjustable clamping means for mounting said arm on a support, including support-engaging elements spaced longitudinally with relation to the support, a single tightening device for said elements and means for evenly distributing the pull of said device on said elements, a switch for the spot light circuit and a conduit for wires, said tightening device, switch and conduit being contained in said hollow arm.

2. In a spot lamp bracket, a hollow supporting arm adapted to bear against a support, bands spaced longitudinally of the support and adapted to surround the support, a yoke located in said arm and engaging said bands, and screw-actuated means located within the arm and adapted, when rotated, to pull said arm against one side of a support and said bands against the other side of a support.

3. In a support bracket, a hollow arm one end of which is adapted to bear against a support and having a shoulder facing in the opposite direction from said support-engaging end, spaced elements adapted to encircle the support, a yoke engaging said elements, a yoke bar engaging said yoke and located within said arm, and a screw operating between said shoulder and said bar to force said arm and said elements into clamping engagement with a support.

4. In combination with a spotlight bracket and a spot light lamp socket slidable in said bracket, a slot in said bracket parallel with the direction of movement of said socket, a screw secured in said socket and extending thru said slot and provided with a nut cooperating therewith to adjustably hold said lamp socket in different positions along said axis and a spring washer bearing against said bracket and through which said screw extends.

5. In combination with a cylindrical spot light bracket element and a spot light lamp socket slidably mounted therein, a slot in said element, a locking screw extending transversely thru said socket, a washer therefor fitting said cylindrical element and providing a flat seat for a locking nut for said screw.

In testimony whereof, I have hereunto subscribed my name this 11th day of August, 1920.

OTHO M. OTTE.